(12) United States Patent
Karres

(10) Patent No.: US 7,038,807 B1
(45) Date of Patent: May 2, 2006

(54) SYSTEM FOR SEQUESTERING PRINT ADVERTISEMENTS AND DISPLAYING THE ADVERTISEMENTS ON AN ELECTRONIC MEDIUM

(76) Inventor: Ellia Karres, P.O. Box 40, Roseville, CA (US) 95678

(*) Notice: Subject to any disclaimer, the term of this patent is extended or adjusted under 35 U.S.C. 154(b) by 0 days.

(21) Appl. No.: 09/557,037

(22) Filed: Apr. 21, 2000

(51) Int. Cl.
*G06F 15/00* (2006.01)

(52) U.S. Cl. ............... 358/1.18; 358/1.13; 358/1.9; 358/2.1

(58) Field of Classification Search ......... 358/1.18, 358/1.12, 1.9, 2.1, 1.13; 705/14, 27, 32, 705/79; 709/219; 715/512, 513; 235/462.49, 235/380, 462.45; 704/260, 272
See application file for complete search history.

(56) References Cited

U.S. PATENT DOCUMENTS

| | | | |
|---|---|---|---|
| 5,146,552 A | | 9/1992 | Cassorla et al. |
| 5,276,793 A | | 1/1994 | Borgendale et al. |
| 5,483,052 A | * | 1/1996 | Smith et al. ........... 235/462.49 |
| 5,604,542 A | * | 2/1997 | Dedrick ..................... 348/552 |
| 5,724,424 A | | 3/1998 | Gifford |
| 5,832,432 A | * | 11/1998 | Trader et al. ............... 704/260 |
| 5,870,552 A | | 2/1999 | Dozier et al. |
| 5,933,811 A | * | 8/1999 | Angles et al. ................ 705/14 |
| 6,026,368 A | | 2/2000 | Brown et al. |

* cited by examiner

*Primary Examiner*—Twyler M. Lamb
(74) *Attorney, Agent, or Firm*—Bernhard Kreten; Audrey A. Millemann; Weintraub Genshlea Chediak

(57) ABSTRACT

A system that sequesters print advertisements within periodicals into an electronic format and provides the capability to display the electronic formats on electronic mediums. Further the system refreshes the electronic format when the advertisement's printed format is changed. This refreshing permits the system to provide a commonality between the printed and electronic format of the advertisements.

7 Claims, 6 Drawing Sheets

SYSTEM FOR SEQUESTERING PRINT ADVERTISEMENTS AND DISPLAYING THE ADVERTISEMENTS ON AN ELECTRONIC MEDIUM

FIELD OF THE INVENTION

The following invention relates generally the invention relates to a system for sequestering advertisement(s) in a tangible medium into an intangible medium and displaying the advertisement(s) in the intangible medium form to where the visual aspects of the advertisement(s) within both mediums possess a commonality. Also generally, the following invention relates to a system for sequestering advertisement(s) from a print format into an electronic format and displaying the advertisement(s) on an electronic media such that the electronic format of the advertisement(s) looks substantially identical to the print format.

In particular, the invention relates to the sequestering of advertisements printed in periodicals having presence within a locale. During sequestration, the advertisements are converted into an electronic format for displaying on electronic instrumentalities. The displaying of the electronic format of the advertisements on the electronic instrumentality makes the visual aspect of the electronic version advertisements look substantially identical to the visual aspect of the print version of the advertisement. As a result a person familiar with the print version of the advertisement would readily recognize the electronic version which would provide the psychological benefit of "brand-loyalty" to the advertiser's product or service when a decision is being made for a purchase. When the advertisement is changed, at the option of the advertiser, thusly the printed version is changed in the periodical, the electronic version would be concurrently refreshed to provide correspondence with the printed version.

More specifically, the present invention provides a system for sequestering advertisements printed in the newspapers into an electronic file and displaying those printed advertisements in the electronic file on a user's video display unit such that what is displayed on the video display unit is substantially identical to what a user would see if and when viewing the printed advertisement within the newspaper. The electronic version of the advertisement would be subsequently refreshed to have commonality with a subsequently printed version of the advertisement. In the alternative, the electronic version could also be updated prior to a subsequently printed version to reflect depletion of inventory, perhaps substituted with alternative products.

BACKGROUND OF THE INVENTION

It is common knowledge that people between 18 and 35 define a consumer class with considerable disposable income and a strong predilection to acquire goods and services. At the same time these people (per capita) rely less on newspapers for information than other forms of media.

Furthermore, the price of paper to print an edition of newspaper has also drastically increased over the years. Consequently, this increase in cost has been passed to the readers. The average price for a Sunday paper in a metropolitan area is $1.50. This cost has "turned away" readership in the Sunday paper because the readers perceive any news from the newspaper is readily available and more current by other media mediums such as: television, radio, and now the Internet. Thus, members of the public may forego a Sunday paper because they perceive that the information they would acquire from that particular Sunday edition does not match the cost of the newspaper. This is unfortunate because the shelf life of an advertisement is longer than the shelf life of the news surrounding the advertisement. Thus, members of the public perceive the major purpose of a newspaper is as a depository of all of the local advertisers' advertisements where the public can comparison shop on products they want to purchase.

This "turning away" of readership from newspapers as a source of information is unfortunate for both readers and local advertisers who utilize the Sunday paper to advertise their products for sale to the local public. The readers miss buying products that they could use offered at a discounted price. The advertisers' overhead in advertising becomes high because the ratio of cost of advertisement to number of persons seeing the advertisement is lower and that the vast majority of the potential buying public for that advertised product is not reached.

Another problem is the buying public's retention of the advertisements within the newspaper. More advertising appears on weekends, especially Sunday, than other days. For example a reader of a Sunday paper could see an advertisement for a product that appeals to him or her. The reader then plans on going to purchase the product, but at that time is unavailable to do so. As time passes the retention in the minds of the reader fades and the reader loses the interest to purchase the product from the advertiser. This results in a loss of sale for the advertiser and the possibility of the person paying more for a product from another vendor. The instant invention disclosed herein would curtail this problem because the advertisement would be readily available and instantly recognizable so as to refresh the memory of the reader.

The patent issued to Angles, et al., U.S. Pat. No. 5,933,811, is for the delivery of custom advertisements based on consumer profiles. This type of target advertisement is heavily dependent upon people willing to provide information on their buying habits. A majority of people are unwilling to provide such information to "on-line" market research because of issues of privacy. Therefore, this type of advertising has seen little usage by "e-commerce". The instant invention does not need consumer profiles in order to provide information to a particular audience. The advertisements present on-line are identical, and thus readily identifiable to the particular public segment, to what the advertisers' advertisement looks like in the newspaper. Further the on-line advertisement extends the shelf-life of the advertisement because it is presented to the target audience for the entire week instead of one day as an example.

The patent issued to Brown, et al., U.S. Pat. No. 6,026,368, discloses a system to queue advertisements. The purpose of queuing is one of prioritization. Again profiles must be built in order to utilize the disclosed invention and the concerns of privacy permeate this disclosed invention as in the previously discussed Angles, et al. patent.

The patent issued to Gifford, et al., U.S. Pat. No. 5,724,424, disclosed digital advertisements for the use of purchasing products on-line. The disclosed invention has no counterpart paper advertisement and the disclosed invention does not disclose whether the digital advertisement is in a form that is readily ascertainable (visually recognizable) to the buying public. The instant invention provides for advertisements that are instantly recognizable to the buying public because the advertisements are identical to the advertisements within the newspaper.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| U.S. PAT. NO. | ISSUE DATE | INVENTOR |
|---|---|---|
| 5,146,552 | Sep. 8, 1992 | Cassorla, et al. |
| 5,276,793 | Jan. 4, 1994 | Borgendale, et al. |
| 5,724,424 | Mar. 3, 1998 | Gifford |
| 5,870,552 | Feb. 9, 1999 | Dozier, et al. |
| 5,933,811 | Aug. 3, 1999 | Angles, et al. |
| 6,026,368 | Feb. 15, 2000 | Brown, et al. |

The prior art listed above but not specifically described further catalogs the prior art of which the applicant is aware. These references diverge even more starkly from the references specifically distinguished above.

SUMMARY OF THE INVENTION

The instant invention provides for a system that sequesters print advertisement within periodicals into an electronic format and provides access to electronic format of those advertisements for display on an electronic medium. In effect, the electronic format extends the shelf life of ads placed in print.

In its essence, the invention constitutes three main parts. The first part is the sequestration of advertisements in a first format into a second format. The second part is the display and access of advertisement in the second format. The third part is the refresh of the second format when the first format is changed either by a need to update items of inventory or the ad format in total.

Further, the instant invention provides for a system to sequester advertisements in a printed-matter format into an electronic format and provides access to the sequestered advertisements via an electronic medium.

Further, provided by the instant invention is a process whereby there is a formulation of an advertisement; the displaying of the advertisement in a periodical; as an option, parsing the advertisement into data fields for entry into a database; uploading the advertisement onto a host computer that is on a wide-area network (WAN), or alternatively, a website with a connection to the Internet via the World Wide Web; permitting the access and display of the advertisement until the next advertisement is printed; deleting or denying access to the old advertisement and proceeding to display the most current advertisement to provide commonality between what is in the print media and what is in the electronic media.

Further, the invention provides for the capability to electronically search for particular advertisements. The search capability provides as options to search title, edition, date and section page number of the periodical. Further provided is the capability to search by name of advertiser, product or service, any special terms used by the advertiser to promote product or service, e.g. slogans, logos, trademarks and servicemarks.

Further provided by the instant invention is a database to store as records the sequestered and parsed advertisements. The defined data fields within each record are the periodical's title; periodical edition; date of publication; periodical section; page; advertiser; product or service; logos, symbols or trade dress; slogan or "catch-phrase;" and any trademark or servicemark.

OBJECTS OF THE INVENTION

It is an object of the invention to provide a system for sequestering advertisements in a first format into a second format and displaying the advertisements in their second format on a medium where there is congruency between the aspects of the two formats.

It is a further object of the invention to provide a system for sequestering in a printed-matter format into an electronic format and displaying the advertisements in their electronic format on an electronic medium where upon the display of the electronic format of the advertisement demonstrates the congruency between the printed format and the electronic format of the advertisements.

Viewed from a first vantage point, it is an object of the present invention to provide a system for the display of advertisements over two communication mediums. The system sequesters advertisements in a first format into a second format. The system displays the second format. The system refreshes the second format when the first format changes in order to provide commonality in the advertisement between the two formats.

Viewed from a second vantage point, it is an object of the present invention to provide a process for displaying an advertisement over two communication mediums. The process provides for sequestering advertisements in a first format into a second format. Next display the second format. Next refresh the second format when the first format changes to maintain commonality therebetween.

Viewed from a third vantage point, it is an object of the present invention to provide a system for displaying an advertisement in two distinct communication mediums. The system includes an editor means for formulating the advertisement on a tangible medium; a printing means for producing the advertisement in a paper medium; a file transfer means to transfer the advertisement from said editor means to a universal remote locator; and a means to permit access to said universal remote location to view the advertisement from a visual display unit until said advertisement is replaced with a more current advertisement generated from said editor means.

Viewed from a fourth vantage point, it is an object of the present invention to provide a process for displaying an advertisement on a wide area computer software including the steps of formulating an advertisement for a product or service; displaying the advertisement in a printed periodical; transferring an electronic identical copy of said advertisement to a universal resource locator; and permitting access to the advertisement at the universal resource location.

These and other objects will be made manifest when considering the following detailed specification when taken in conjunction with the appended drawing figures.

DESCRIPTION OF PREFERRED EMBODIMENTS

Figure 1:
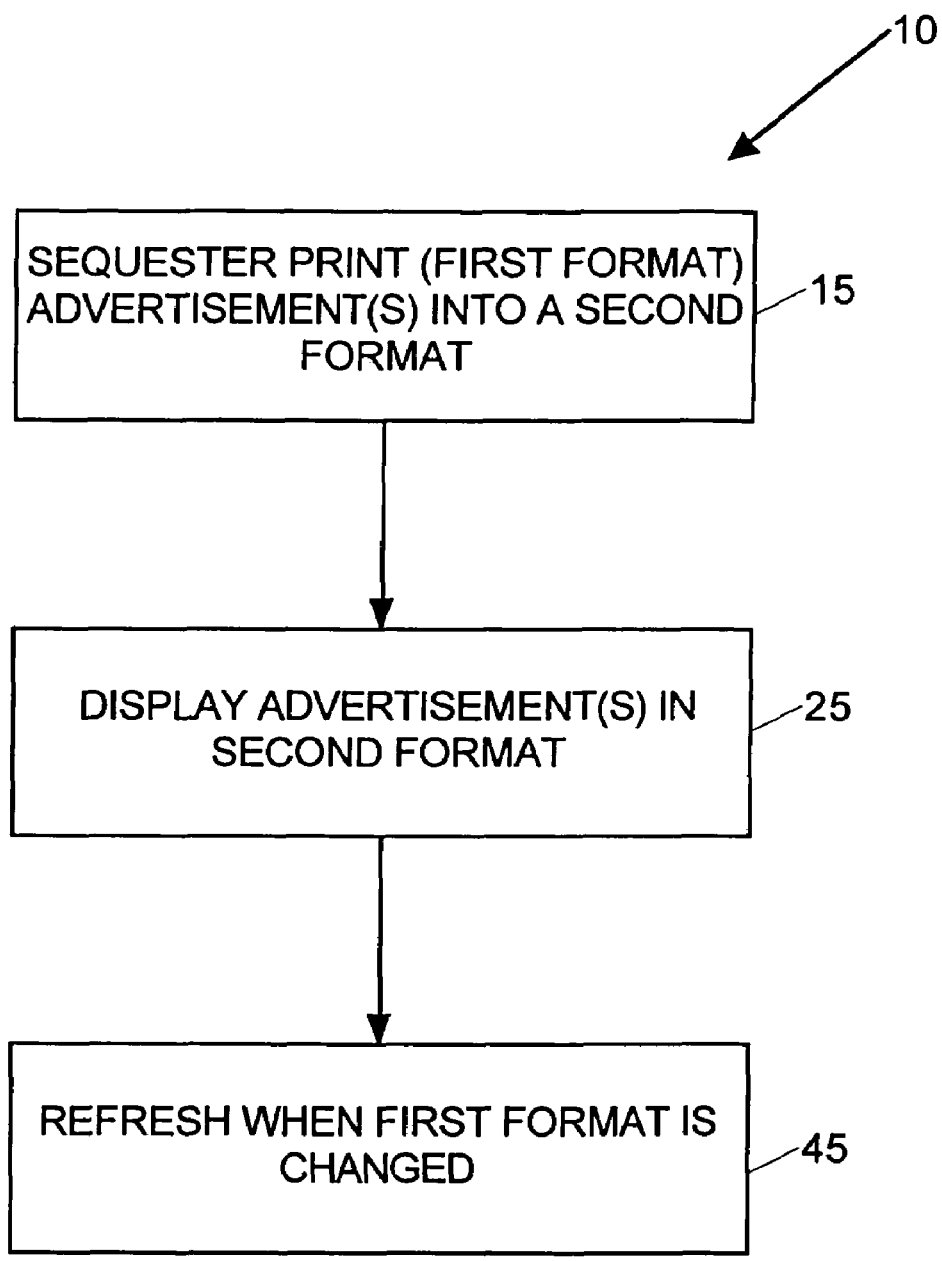
FIG. 1 is a flow chart overview the system of the present invention.

Considering the drawings, wherein like reference numerals denote like parts throughout the various drawing figures, reference numeral 10 is directed to the preferred embodiment according to the present invention.

In FIG. 1, it can be seen that the system 10 constitutes three major parts as the present invention. The first part 15 is the sequestering of the advertisement(s) in its first format, e.g. its printed version, within a periodical into a second format, e.g. electronic file, for readying the display thereof. The second part 25 is the display of the advertisement(s) in their second format. The displaying is through an electronic instrumentality, e.g. cathode ray tube, video display unit, LCD, LED, plasma display, etc. The type of instrumentality is of no importance, so long as the instrumentality can present the second format of the advertisement in a form that is readily recognizable to the first format, in this illustrative case, the printed version.

Figure 1A:
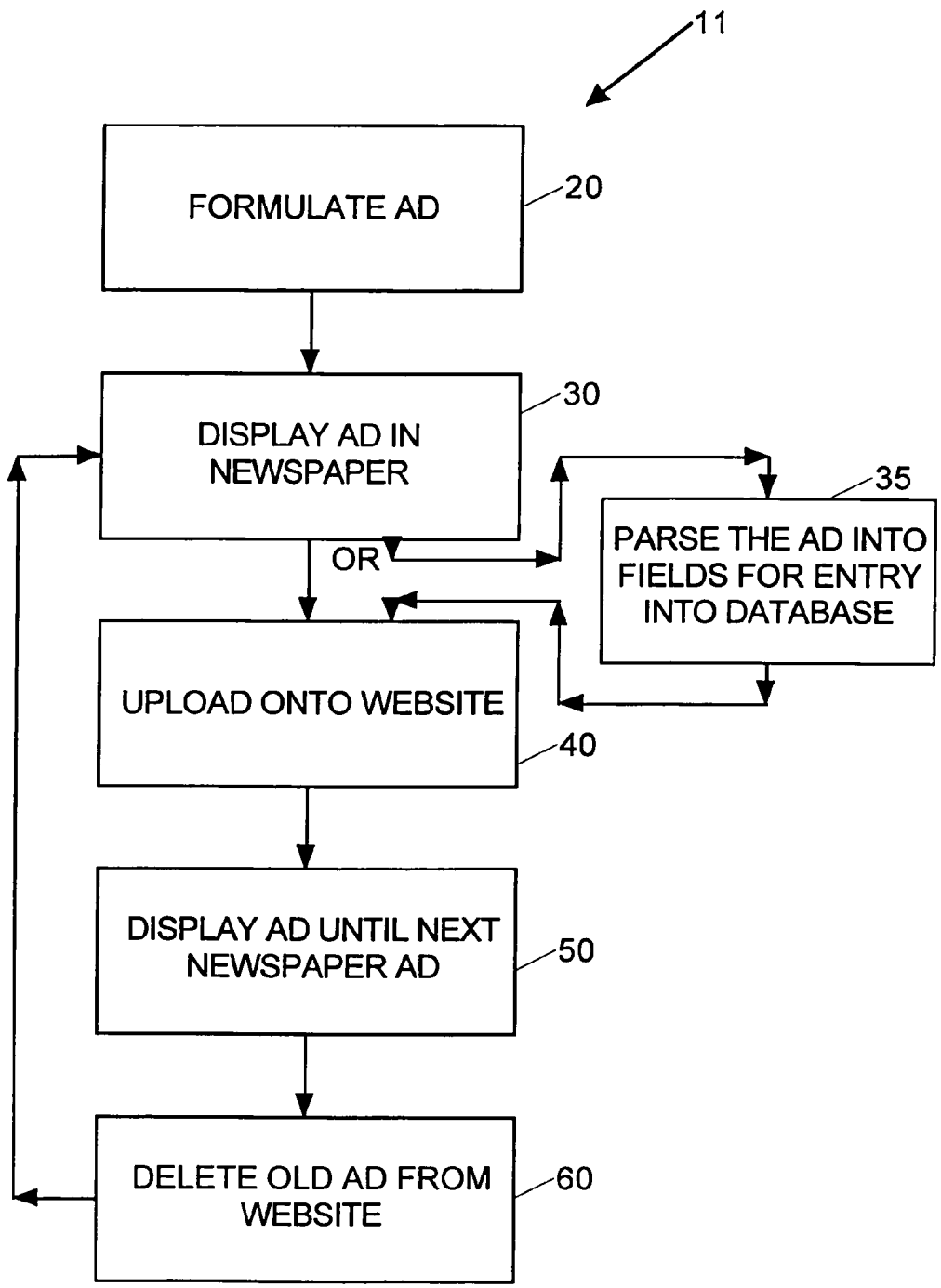
FIG. 1A is a flow chart representing the process of the present invention.

FIG. 1A represents the process 110 followed by the present invention. The process begins with the advertiser formulating the advertisement to be published in the periodical edition for the upcoming edition. For example, the advertisement could be one that will appear in the "Sunday paper" in a metropolitan area (Sacramento, San Francisco, Los Angeles, Chicago, New York, Washington, D.C., London, etc.).

Formulation of advertisement for the advertiser is usually done by an "ad-firm" that the advertiser has independently contracted out to develop the "ad-campaign". Formulation could also be done "in-house" at the advertiser's place of business. Formulation of advertisements could also be done at the publisher of the periodical, e.g., a newspaper publisher. However, for simple advertisements like those found in the "classified section" of a newspaper, it is not skill or labor intensive to present advertisements in an intelligible manner so that the reader could comprehend what the advertisement is trying to convey. Large, full page ads of course require greater artistry and layout skills.

Figure 2:
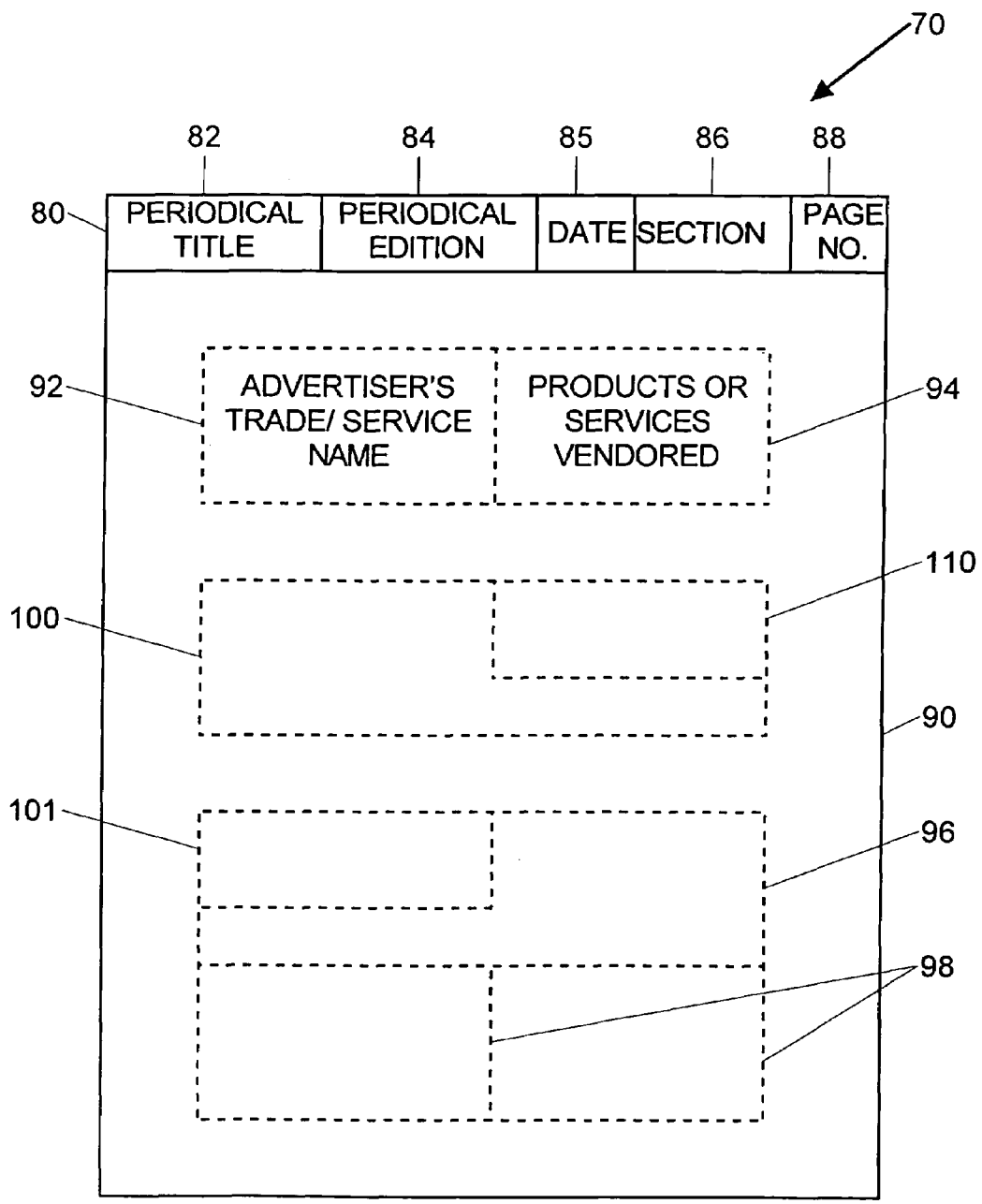
FIG. 2 is an illustrative example of an advertisement an advertiser places in a periodical whose readership covers the geographical area the advertiser wishes to reach.

The next step in the process is the display of the formulated advertisement in the periodical of the advertiser's choosing. As an illustrative example, and not be construed as limiting the scope of the instant invention, is the advertiser's choice of a full page color advertisement in the Sunday edition of the newspaper serving the area of interest that the advertiser wishes recognition in. For example, FIG. 2 is an illustrative case where a particular advertiser wishes to place a full page color advertisement in the newspaper serving the geographical area that the advertiser wishes to solicit business therefrom. This illustrative newspaper page 70 with a full page color advertisement 90 contains multiple parts important to conveying to the reader what message the advertiser is trying to deliver. The advertisement page 70 contains a header 86 that is the standard header utilized by the publisher of the periodical to contain information regarded as important by the publisher to assist in the readership of the periodical. For instance, the header 80 contains: the periodical's title 82; the periodical's edition 84; the publication's date 85; the section 86 of the edition that the actual advertisement 90 is located in; and the page number 88 that the advertisement is located within the periodical. The information within the header 80 will be parsed so as to enable it to be placed in a relational database for electronic retrieval purposes that will be discussed infra.

Below the header 80 as shown in FIG. 2 is the advertisement 90: in this case an illustrative "full page color advertisement." The advertisement 90 is designed to catch the attention of the readers and make them interested in purchasing the product or service being advertised by the advertiser. In this illustrative case, the advertisement contains important identification information to familiarize the reader with the advertiser and build a rapport between the reader and the advertiser. A few illustrative identifiers are listed below. The name of the advertiser 92 is present. The product or service 94—which may also be incorporated into the advertiser's name—is present. Also present is any logo or symbol or trade dress 100 to immediately identify the advertiser to the reader of the advertisement 90. Of further importance is a slogan or "catch phrase" 101 to draw the reader's attention to the advertisement 90. And, also of importance is any registered trademark or service mark 110 that is used for immediate recognition of any goods or services that the advertiser has to offer the buying public. Finally, after drawing the reader's attention to the advertisement 90 there are any main messages 96 conveying what goods or services the advertiser is offering the buying public and ancillary messages 98 to inform the reader of other items or services and any terms or conditions or legal obligations that has to be met by the public, advertiser or both.

An advertising clearing-house service would gather all of the advertisements from periodicals that have a presence in the geographical locale that the service wishes to convert from print form to electronic format.

Figure 5:
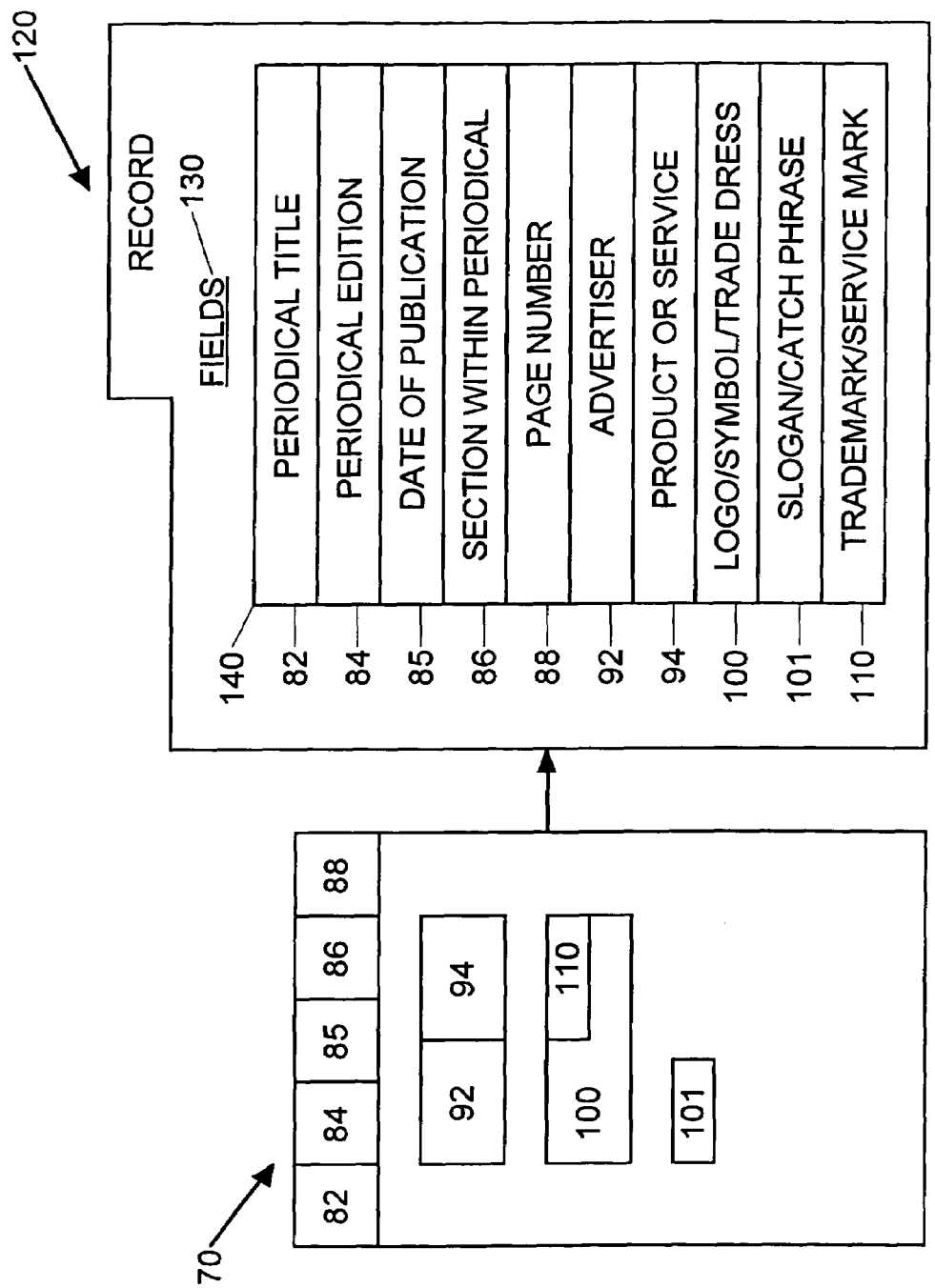
FIG. 5 is a representation of a database for the invention.

Going back to the process shown in FIG. 1 the next step 35 (which is optional) is parsing the advertisement into data fields for entry into a database. Particular data of an advertisement page 70 is stored as a record 120 as shown in FIG. 5. Each record 120 would contain a number of fields 130. Each field 130 has one of the pieces information 82, 84, 85, 86, 88, 92, 94, 100, 101, 110 that have been discussed supra as an individual data items.

To create this database first define the structure of the records 120; then state how many fields 130 and length thereof will be in each record 120; what the labels 140 for each field will be; what type of data (numeric or character or alpha-numeric data) will be stored in the field; and what the width of the field will be. Once the fields are defined, entry of the data can be achieved by a number of ways. For instance, data pertaining to each advertisement can be manually entered. Or, because of electronic publishing technology the data could be ported over from the electronic representation of the advertisement within an electronic publishing computer application to a database computer application program able to create and modify the records. Either means of data entry would generate the records 120 and utilizing a search engine would permit people to search the records.

Proceeding through the process shown in FIG. 1, the step of uploading the advertisement page 70 onto a universal resource locator (URL), e.g., a website on the World Wide Web, is done by the advertising clearing-house mentioned supra. The advertising clearing-house is preferably the registered owner of the domain name and the host of the URL that uploads, processes and stores the advertisements in print form from the periodicals that have a presence within the clearing-house's area of coverage. The upload permits people with access to a wide area network (WAN), e.g., the Internet, to view the advertisement page on their visual display units (VDUs) like they would be viewing the printed page advertisement 70 in the periodical that the advertisement is published in.

How the advertisement in the newspaper is uploaded onto a website for viewing and downloading to those with Internet access will be explained infra. Publishing technology has readily advanced to where typesetting is now done by sophisticated computer programs that produce high quality, including ranges of typefaces, and automatically make the decision regarding spacing, justification, pagination and formatting; to where the limitations on the rates of printing the publication are determined by the speed of the human keyboard operators. The new "fourth-generation" photo typesetters store the layouts within their memories. It is therefore easy to take the data within the photo typesetter's memory and format it into a particular computer syntax for publishing like Page Description Language (PDL), save the data as a PDL file and convert, using a file conversion application. The PDL file converts into Hyper-text Mark-up Language (HTML) in order to upload a file into a computer on the Web and have it readable by all other computers waiting to access that information. Once the HTML file is uploaded to the URL the advertisement is readily available for display via utilization of one of the popular web-based browsers. Thus, the next step of displaying the advertisement is achieved through access of the HTML file via a web-based browser through an Internet Service Provider (ISP).

Preferably the advertisement is "displayed" i.e., accessible, until the next advertisement is generated by the advertiser for placement in the periodical's next edition, e.g., next Sunday paper. Alternatively (or in addition), edits can be made prior to the next edition to reflect changes in inventory, reflecting sales. Once the subsequent edition is out to the public, or even prior to that moment, the previous advertisement page is preferably made unavailable for access either through deletion of its HTML file or leaving the file on the host computer but denying access or substituting the new advertisement HTML with the existing HTML file name and change the file name of the previous advertisement or deleting the advertisement out right. Any and all ways of file management are available to use—the point being that what should be achieved is keeping the advertisement displayed by the host computer current with the latest period for that periodical's edition. In this manner, an advertiser, especially for expensive large ads in a Sunday paper, can extend the useful "shelf life" of the ad beyond the one day publication.

Figure 3:
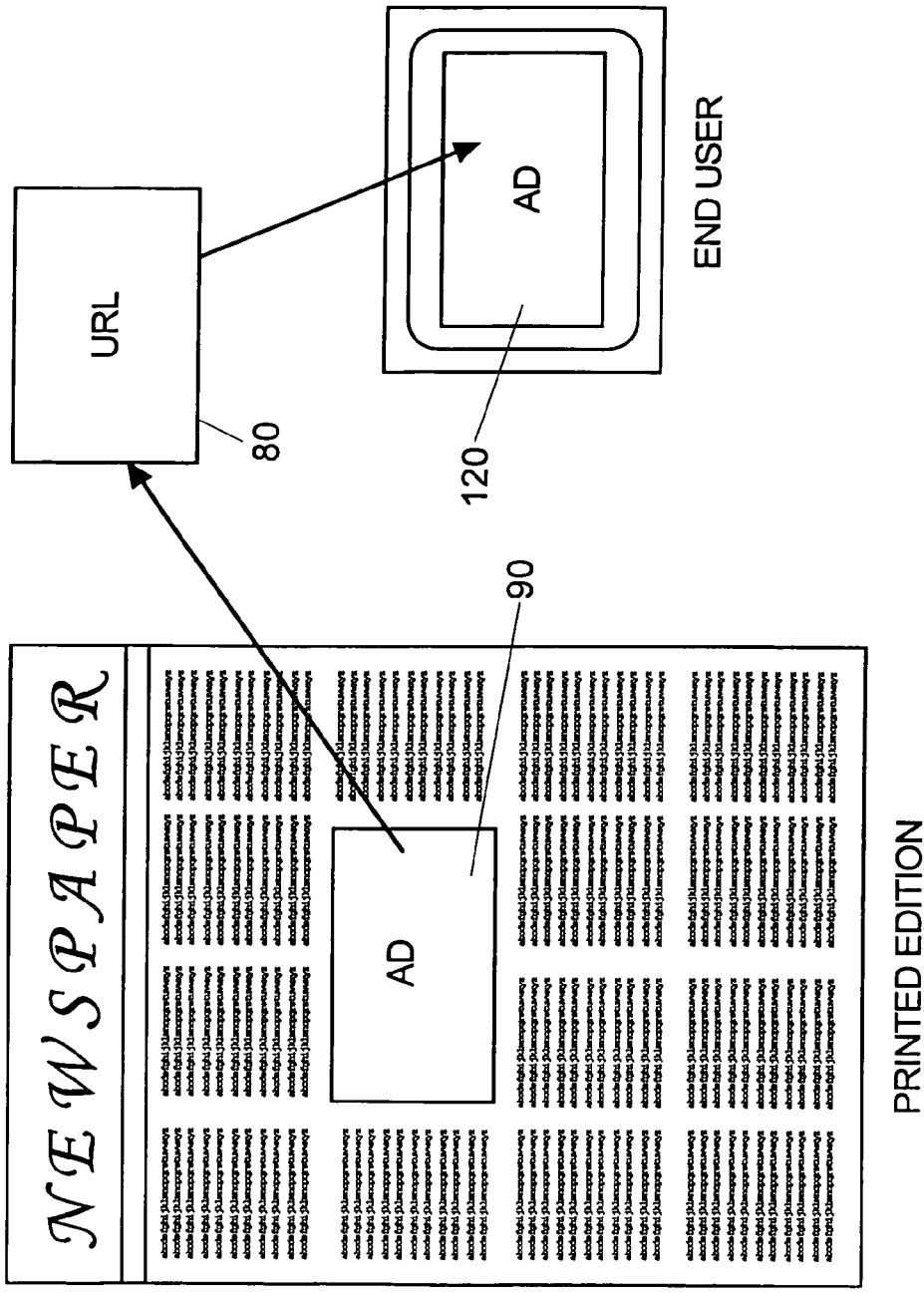
FIG. 3 is a block diagram representing the transferring of the advertisement from printed matter form to electronic form.

FIG. 3 provides an overview of the present invention and the goal the present invention is trying to achieve. As shown, the advertisement 90 is preferably placed in the newspaper serving the region audience that the advertiser is trying to reach. A facsimile of the advertisement 90 is uploaded to a universal resource locator (website) or posted on a bulletin board service (BBS). The salient feature of the uploading is that the advertisement 90 retains its familiarity to the readers of the periodical from which it originated, i.e., it looks identical to what was published in the paper, when it is displayed on the video display unit 120 (a reverse WYSIWYG in computer parlance). This is necessary so that when users of the WAN that are familiar with the periodical and advertiser's advertisement can readily ascertain who is the advertiser and what goods or services are being offered for sale or what information is conveyed to the public.

Figure 4:
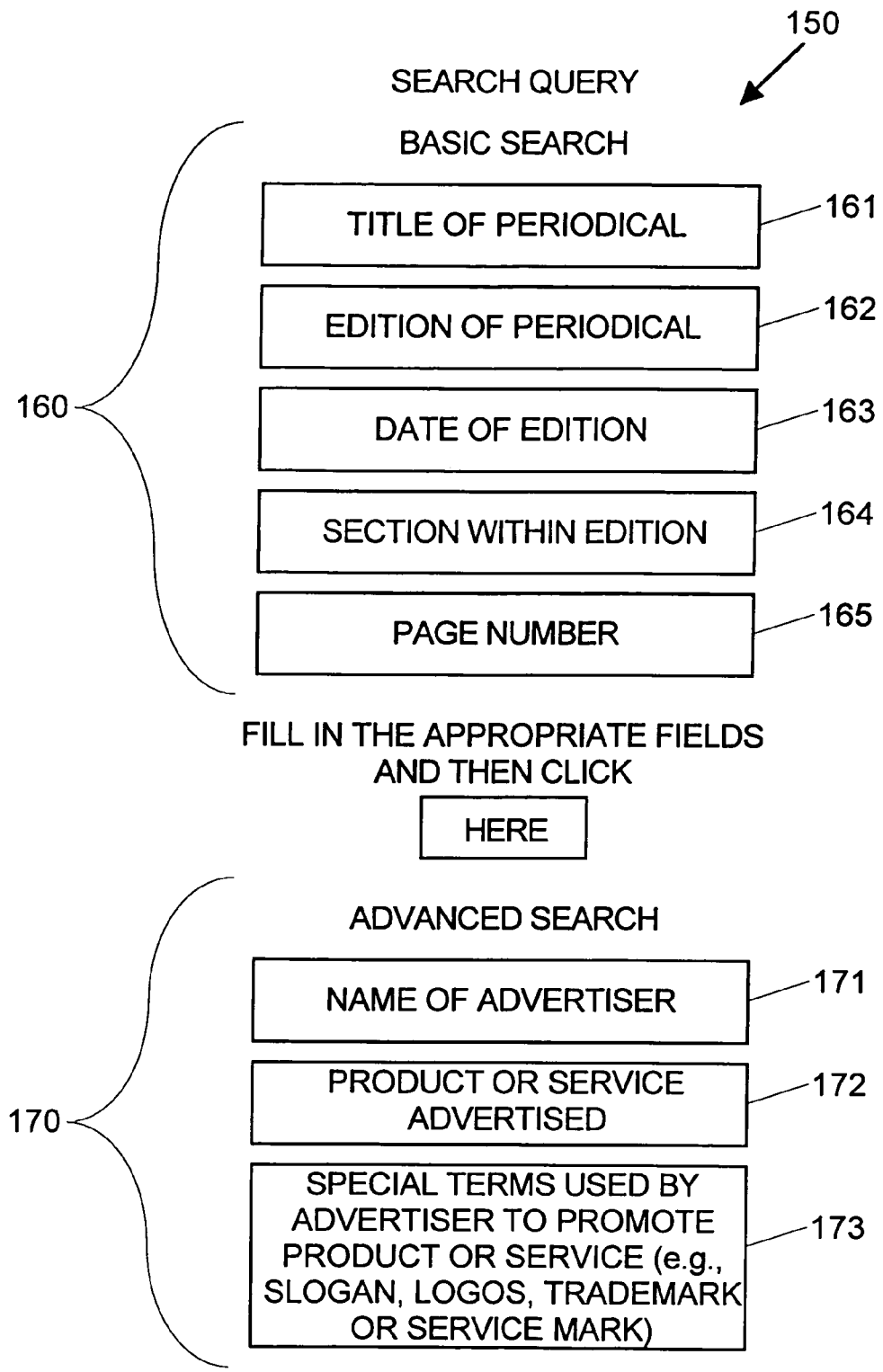
FIG. 4 is a representation of a search query for the invention.

FIG. 4 shows an additional feature of the present invention, that is optional. This feature is a search query for the user to use in order to find or navigate to a particular advertisement that they saw in the periodical. However, it is not a requirement for users to have actually seen the advertisement in order to use this feature. The end user of the present invention could just as well have heard from a third party about the advertisement within the periodical and are now unable or unwilling to obtain that edition of the periodical, that contains the advertisement. Or, the end user knows that a particular advertiser advertises in a particular periodical and the end user is just interested in what that advertiser is offering for sale during the term that the advertisement is available. Regardless of how the end user reaches the search query feature of the present invention, the manner of operation to achieve the results is the same. The search query feature 150 is divided into two searches: a basic search entails filling in the appropriate information within one or more of the query fields 161–165. Of course, the more query fields 161–165 that are filled in, the yield of results would be greater. The term basic search is not to be construed as being elementary. The term should be construed as not requiring a lot of processing power to execute the search because of the relatively finite number of periodicals available to the public. The end user has the option to utilize the advanced search feature 170. In a similar vein, the term "advanced search" should not be construed as complex, but as requiring relatively more processing power to achieve results because of the large number of advertisers that place advertisements in periodicals. To utilize this feature, the end user has to fill-in at least one of the fields 171–173 presented. Again, the more information put into the system, the better the results would be in focusing on a particular advertisement or set of advertisements.

Once the end user enters data into the appropriate fields and initiates the search query with the appropriate prompt, e.g., a computer mouse click or pressing an Enter key on a computer keyboard, the search is executed and the results are displayed of the advertisement that most likely corresponds to the search terms.

As an alternative embodiment within the present invention is instead of uploading to a URL the advertisements are copied onto video tape or the like medium. The video tape or the like is then brought to the local CATV and played in the studio room over the cable system to be projected onto the end user's television set. This allows the end user to tune-in to a particular cable access channel and view the advertisements. The advantage of the system is the breadth of audience reached.

Most people, especially those of lower income, do not have ready access to the Internet. However, a majority of American households have cable TV and with the upgrades to digital cable TV being readily and affordably available to a vast number of people the search query feature of FIG. 4 could be utilized in this embodiment as well.

In an analogous embodiment that combines the first and second embodiments is a Web TV system could be used to gain access to the host containing the advertisements and downloading those advertisements onto the television screens of end users. This alternative avoids the cost of having to buy an entire computer system to gain access to the Internet and the advertisement posted thereon.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A system for displaying an advertisement in two distinct communication forms comprising:
   an editor means for first formulating the advertisement on a tangible medium;
   a printing means for initially producing the advertisement onto a paper medium;
   a file transfer means to transfer the advertisement from said editor means to a universal remote locator; and
   a means to permit access to said universal remote location to view the advertisement from a visual display unit until said advertisement is replaced with a more current advertisement generated from said editor means.

2. A process for displaying an advertisement on a wide area computer network comprising:
   formulating an advertisement for a product or service;
   initially displaying the advertisement in a printed periodical;
   transferring an electronic identical copy of said advertisement to a universal resource locator; and
   permitting access to the advertisement at the universal resource location.

3. The process of claim 2 further including the step of:
   replacing the electronically displayed advertisement with a more recently formulated advertisement to maintain commonality between the most recent printed advertisement and the electronic advertisement.

4. A system for the display of newspaper advertisements on the internet comprising:
   means to convert advertisements from a newspaper format into an internet format;
   display means to display said internet format; and
   means to modify the internet format when information pertaining to the contents of the newspaper advertisement changes.

5. A system for displaying an advertisement in a periodical and the internet comprising:
   an editor means for formulating the advertisement on a tangible medium;
   a printing means for producing the advertisement in the periodical;
   a file transfer means to transfer the advertisement from said editor means to a universal remote locator; and
   a means to permit access to said universal remote location to view the advertisement from a visual display until said advertisement is replaced with a more current advertisement generated from said editor means.

6. A process for displaying an advertisement on a wide area computer network comprising:
   formulating an advertisement for a product or service;
   displaying the advertisement in a printed periodical;
   fractionating the advertisement into data fields;
   transferring an electronic identical copy of said advertisement along with the data fields to a universal resource locator; and
   permitting access to the advertisement at the universal resource location.

7. The process of claim 6 further including the step of:
   allowing searching for the electronically displayed advertisement by the data fields by presenting a query field to the user.

* * * * *